(12) United States Patent
Nojima et al.

(10) Patent No.: US 7,693,427 B2
(45) Date of Patent: Apr. 6, 2010

(54) MODULATOR, OPTICAL TRANSMITTER AND OPTICAL TRANSMISSION APPARATUS

(75) Inventors: Kazuhiro Nojima, Kanagawa (JP); Tomoaki Ohira, Osaka (JP)

(73) Assignee: Panasonic Corporation, Osaka (JP)

( * ) Notice: Subject to any disclaimer, the term of this patent is extended or adjusted under 35 U.S.C. 154(b) by 578 days.

(21) Appl. No.: 11/570,527

(22) PCT Filed: Jul. 21, 2005

(86) PCT No.: PCT/JP2005/013379
§ 371 (c)(1),
(2), (4) Date: Dec. 13, 2006

(87) PCT Pub. No.: WO2006/011410
PCT Pub. Date: Feb. 2, 2006

(65) Prior Publication Data
US 2008/0056730 A1 Mar. 6, 2008

(30) Foreign Application Priority Data
Jul. 30, 2004 (JP) ............................. 2004-224146

(51) Int. Cl.
*H04B 10/12* (2006.01)
(52) U.S. Cl. .................. 398/185; 398/187; 398/188; 398/182; 398/183; 398/189; 398/200; 370/295
(58) Field of Classification Search .............. 398/185, 398/183, 182, 188, 189, 200, 186, 187; 370/295
See application file for complete search history.

(56) References Cited
U.S. PATENT DOCUMENTS
3,020,398 A * 2/1962 Hyde ........................ 455/46
(Continued)

FOREIGN PATENT DOCUMENTS
JP 7-183870 7/1995
(Continued)

OTHER PUBLICATIONS

Kikushima et al., "Super-Wide-Band Optical FM Modulation Scheme and its Application to Multichannel AM Video Transmission Systems", IEEE Photonics Technology Letters, vol. 8, No. 6, Jun. 1996, pp. 839-841.

*Primary Examiner*—Ken N Vanderpuye
*Assistant Examiner*—Amine Benlagsir
(74) *Attorney, Agent, or Firm*—Pearne & Gordon LLP

(57) ABSTRACT

An object of this invention is to provide a modulator, an optical transmitter and an optical transfer device which can modulate a channel signal while suppressing residual AM signals regardless of the frequency of a channel signal and suppressing deterioration of the channel signal due to impossibility of giving a sufficient FM demodulation amplitude. A modulator 2 according to this invention is a modulator 2 for modulating an input signal, comprising: a branching circuit 21 for producing an inverted signal with an inverted phase of the phase of a first input signal transferred within a first frequency bandwidth; a first semiconductor laser 22a for FM-modulating the first input signal to produce a first FM-modulated light beam; a second semiconductor laser 22b for FM-modulating the inverted signal to produce a second FM-modulated light beam; an optical phase-modulating unit 23 for changing the phase of one of the first FM-modulated light beam and the second FM-modulated light beam on the basis of a second input signal transferred within a second frequency bandwidth, thereby producing a phase-modulated light beam; an optical merging unit 24 for merging the other of the first FM-modulated light beam and the second FM-modulated light beam and the phase-modulated light beam thereby to produce a modulated light beam; and a photoelectric converting unit 25 for converting the modulated light beam in a modulated signal through optical heterodyne detection.

8 Claims, 8 Drawing Sheets

U.S. PATENT DOCUMENTS

| | | | | |
|---|---|---|---|---|
| 3,624,402 | A * | 11/1971 | Thaler | 398/201 |
| 4,722,081 | A * | 1/1988 | Fujito et al. | 398/76 |
| 4,726,644 | A * | 2/1988 | Mathis | 385/24 |
| 4,768,186 | A * | 8/1988 | Bodell | 398/76 |
| 4,959,862 | A * | 9/1990 | Davidov et al. | 380/212 |
| 5,016,242 | A * | 5/1991 | Tang | 398/76 |
| 5,351,148 | A * | 9/1994 | Maeda et al. | 398/76 |
| 5,373,383 | A * | 12/1994 | LaGasse | 398/26 |
| 5,973,820 | A * | 10/1999 | Fuse et al. | 359/278 |
| 6,067,177 | A * | 5/2000 | Kanazawa | 398/1 |
| 6,486,986 | B1 * | 11/2002 | Fuse | 398/186 |
| 6,512,621 | B1 * | 1/2003 | Fuse et al. | 398/187 |
| 6,748,173 | B2 * | 6/2004 | Ishii et al. | 398/79 |
| 2001/0008451 | A1 * | 7/2001 | Ishii et al. | 359/124 |

FOREIGN PATENT DOCUMENTS

| | | |
|---|---|---|
| JP | 10-13354 | 1/1998 |
| JP | 11-68670 | 3/1999 |
| JP | 11-74847 | 3/1999 |
| JP | 11-112433 | 4/1999 |

* cited by examiner

US 7,693,427 B2

MODULATOR, OPTICAL TRANSMITTER AND OPTICAL TRANSMISSION APPARATUS

TECHNICAL FIELD

This invention relates to an optical transfer device for transferring a multi-channel signal through an optical fiber, and more specifically to a modulator for modulating a multi-channel signal, an optical transmitter for transmitting the signal modulated by the modulator and an optical transfer device including the optical transmitter.

BACKGROUND ART

As a conventional optical transfer device for transferring a multi-channel signal through an optical fiber, there has been proposed an optical transfer device which modulates the multi-channel signal by a modulator using an optical heterodyne detecting system and converts the signal thus modulated into an optical signal to be transferred (For example, see Non-Patent Reference 1).

FIG. 5 is an arrangement view of a conventional optical transfer device, including an FM modulator using the optical heterodyne detecting system. The conventional optical transfer device includes an optical transmitter 11 constructed of an FM modulator 12 for modulating an input multi-channel signal into an FM signal which is an electric signal and an EO converter section for converting the FM signal into an optical signal to be sent out to an optical fiber 4; and an optical receiver 5 constructed of an OE converter section 6 for converting the optical signal transferred through the optical fiber 4 into the electric signal and an FM demodulator 7 for FM demodulating the electric signal to be outputted.

Now referring to FIG. 5 and FIG. 6 showing the output spectra of the respective components of the conventional FM modulator and a conventional FM de-modulator, a detailed explanation will be given of the FM modulator 12.

A branching circuit 121, when a multi-channel signal frequency-multiplexed as shown in FIG. 6(a) is supplied to the FM modulator, supplies two multi-channel signals phase-converted to a first semiconductor laser 122a and a second semiconductor laser 122b which provide different wavelengths, respectively.

The semiconductor laser 122a and the semiconductor 122b supply, to a photo-coupler 123, FM-modulated light beams as shown in FIGS. 6(b) and 6(c) whose optical frequencies are FM-modulated on the basis of the multi-channel signal received, respectively. The spectrum of each the FM-modulated light beams produced from the semiconductor lasers 122a, 122b is FM-modulated in the vicinity of about 200 THz by the multi-channel signals supplied to the semiconductor lasers 122a, 122b (The spectrum is spread by the FM modulation). Further, when the optical frequencies of the semiconductor lasers 122a, 122b are FM-modulated, their strengths are also modulated so that the spectrum of the FM-modulated light from each of the semiconductor lasers 122a, 122b generates a residual AM signal having the same frequency component as that of the multi-channel signal. The residual AM signal generates noise in the multi-channel signal after FM demodulation and deteriorates the distortion characteristic.

A photo-coupler 123 merges these two FM-modulated light beams and supplies the resultant optical signal to a light-receiving element 125. Since the two multi-channel signals which FM-modulate the optical frequencies of the semiconductor laser 122a and the semiconductor laser 122b are inverted in their phase, the above residual AM components are also converted in their phase. Thus, in merging, the photo-coupler 124 cancels the residual AM components the residual AM components of the FM modulated light beams produced from the semiconductor laser 122a and the semiconductor laser 122b, respectively. As a result, the optical signal produced from the photo-coupler 124 does not contain the residual AM signal as shown in FIG. 6(d).

The light receiving element 125 produces, through optical heterodyne detection, the FM signal which is an electric signal based on a frequency difference between the two FM-modulated light beams thus merged. FIG. 6(e) shows the FM signal produced from the light receiving element 125. This FM signal is acquired by FM-modulating the multi-channel signal supplied to the FM modulator 12. Its central frequency is determined by a difference between the central values of the optical frequencies of the two semiconductor lasers 122a, 122b.

The optical receiver 5 receives the multi-channel signal as shown in FIG. 6(f) obtained by FM-demodulating the FM signal shown in FIG. 6(e).

In this way, in accordance with the conventional optical transfer device including the FM modulator, by modulating the optical frequencies of the two semiconductor lasers on the basis of two multi-channel signals with inverted phases, respectively and merging the FM-modulated light beams produced from the two semiconductor lasers, the residual AM signals contained in the respective FM-modulated light beams can be cancelled. For this reason, the multi-channel signal supplied to the FM modulator can be modulated with the residual AM signal suppressed (For example, see Patent Reference 1).

Further, an explanation will be given of the optical phase modulator not generating the above residual AM signal referring to FIG. 7, which is a configuration view of a conventional optical transfer device including an optical phase modulator using an optical heterodyne detecting system, and FIG. 8 showing output spectra of the respective components of a conventional optical phase modulator and a conventional FM demodulator. In FIGS. 7 and 8, like reference numerals refer to like elements in FIGS. 5 and 6.

Semiconductor lasers 222a, 222b produce optical signals with no modulation (local light beams) shown in FIG. 8(b).

An optical phase modulator 223 phase-modulates the local light beam produced from the semiconductor laser 222b on the basis of the frequency-multiplexed multi-channel signal, thereby producing the phase-modulated light beam shown in FIG. 8(c). The spectrum of the phase-modulated light beam produced from the optical phase modulator 223 is modulated in the vicinity of about 200 THz by the multi-channel signal supplied to the optical phase modulator 223. By phase-modulating the local light beam produced from the semiconductor laser by the optical phase modulator 223, the residual AM signal is not generated.

The photo-coupler 223 merges the local light beam produced from the semiconductor laser 222a and the phase-modulated light beam produced from the optical phase modulator 223, thus supplying the optical signal shown in FIG. 8(d) to the light receiving element 223.

The light receiving element 225 produces, through optical heterodyne detection, a phase-modulated signal which is an electric signal based on a frequency difference between the merged two optical signals. FIG. 8(e) shows the phase-modulated signal produced from the light receiving element 225. This phase-modulated signal is acquired by phase-modulating the multi-channel signal supplied to the optical phase modulator 223. Its central frequency is determined by a difference between the central values of the optical frequencies produced from the two semiconductor lasers 122a, 122b.

The optical receiver 5 receives the multi-channel signal as shown in FIG. 8(f) obtained by FM-demodulating the phase-modulated signal shown in FIG. 8(e). Since the phase modulation and the frequency modulation are angular modulation systems belonging to substantially the same category, the multi-channel signal can be demodulated by the FM demodulator 7 in the optical receiver 5.

In this way, in accordance with the conventional optical transfer device including the optical phase modulator, by phase-modulating the local light beam produced from the semiconductor laser on the basis of the multi-channel signal, the multi-channel signal supplied to the phase modulator can be phase-modulated without generating the residual AM signal (For example, see Patent Reference 2).

Patent Reference 1: JP-A-11-112433
Patent Reference 2: JP-A-10-13354
Non-Patent Reference 1: K. Kikushima, et al.: Super-wide-band optical FM modulation scheme and its application to multi-channel AM vide transmission systems, IEEE Photonics Technology Letters, pp. 839-841, 1996.

DISCLOSURE OF THE INVENTION

Problems that the Invention is to Solve

However, in the conventional optical transfer device including an FM modulator, if the frequency of the multi-channel signal which FM-modulates the optical frequency of the semiconductor laser is high, it is difficult to supply the two FM modulated light beams with their phases exactly inverted to the photo-coupler. So, the residual AM signals cannot be cancelled even if the two FM-modulated light beams are merged. For example, in order to cancel the residual AM signals sufficiently, where a permissible phase difference between the two multi-channel signals is set at 10°, between the two paths from the branching circuit to the photo-coupler, a delay difference of about 280 ps is permissible at 100 Hz, but the delay difference of about 14 ps is only permissible at 20 GHz. The delay difference of 14 ps is likely to occur owing to changes such as the group delay of the semiconductor laser or that of the branching circuit. Therefore, it is difficult to cancel the residual AM signals sufficiently.

Further, in the conventional optical transfer device including an optical phase modulator, if the frequency of the multi-channel signal for phase-modulating the optical frequency of the semiconductor laser is low, as shown in FIG. 8(f), the multi-channel signal obtained by demodulating the phase-modulated signal by the optical receiver has a frequency characteristic giving a smaller amplitude for the channel signal at a lower frequency so that the channel signal at the low frequency cannot provide a sufficient FM demodulation amplitude, thus leading to signal deterioration.

This invention has been accomplished in view of the above circumstances. An object of this invention is to provide a modulator, an optical transmitter and an optical transfer device which can modulate a channel signal while suppressing residual AM signals regardless of the frequency of a channel signal and suppressing deterioration of the channel signal due to impossibility of giving a sufficient FM demodulation amplitude.

Means for Solving the Problems

The modulator according to this invention is a modulator for modulating an input signal, comprising: a phase inverting unit for producing an inverted signal with an inverted phase of the phase of a first input signal transferred within a first frequency bandwidth; a first semiconductor laser for FM-modulating the first input signal to produce a first FM-modulated light beam; a second semiconductor laser for FM-modulating the inverted signal to produce a second FM-modulated light beam; an optical phase-modulating unit for changing the phase of one of the first FM-modulated light beam and the second FM-modulated light beam on the basis of a second input signal transferred within a second frequency bandwidth, thereby producing a phase-modulated light beam; an optical merging unit for merging the phase-modulated light beam and the other of the first FM-modulated light beam and the second FM-modulated light beam to produce a modulated light beam; and a photoelectric converting unit for converting the modulated light beam in a modulated signal through optical heterodyne detection.

In accordance with this configuration, the residual AM signal can be suppressed regardless of the frequency of the channel signal and deterioration of the channel signal due to impossibility of giving a sufficient FM demodulation amplitude in such a manner that as regards the channel signal at a low frequency, the optical frequency of the semiconductor laser is modulated by FM modulation and as regards the channel signal at a high frequency, the optical frequency of the semiconductor laser is modulated by the optical phase modulator.

Further, in the modulator according to this invention, the optical phase modulating unit changes the phase of the first FM-modulated light beam on the basis of the second input signal to produce a first phase-modulated light beam and changes the phase of the second FM-modulated light beam on the basis of a third input signal transferred with a third frequency bandwidth to produce a second phase-modulated light beam; and the optical merging unit for merging the first phase-modulated light beam and the second-modulated light beam to produce the modulated light beam.

In accordance with this configuration, since the optical frequencies of the semiconductor lasers are respectively phase-modulated, a large number of multi-channel signals can be modulated at a time.

Further, the modulator according to this invention comprises a timing control unit for controlling the timing of producing the first FM-modulated light beam from the first semiconductor laser or the timing of producing the second FM-modulated light beam from the second semiconductor laser.

In accordance with this configuration, even if a delay occurs by the optical phase modulation of the FM-modulated light beams produced from the semiconductor lasers so that the phases of the two modulated light beams supplied to the photo-coupler cannot be exactly inverted, by controlling the timing of producing the modulated light beams by the two semiconductor lasers and merge these phase-inverted two modulated light beams, the residual AM signals can be cancelled.

The modulator according to this invention comprises an optical delaying unit for delaying the phase of one of the first FM-modulated light beam and the second FM-modulated light beam.

In accordance with this configuration, even if a delay occurs by the optical phase modulation of the FM-modulated light beam produced from the semiconductor laser so that the phases of the two modulated light beams supplied to the photo-coupler cannot be exactly inverted, by delaying the phase of the FM-modulated light beam not delayed by the extent of delay occurred and merging these phase-inverted two modulated light beams with the inverted phases, the residual AM signals can be cancelled.

Further, in the modulator according to this invention, the first input signal, the second input signal and the third input signal are multi-channel signals frequency-multiplexed, respectively.

In accordance with this configuration, by supplying a plurality of input signals frequency-multiplexed to the modulator, a large number of multi-channel signals can be modulated at a time.

Further, in the modulator according to this invention, the first frequency bandwidth is equal to or lower than 900 MHz and the second and third frequency bandwidth are equal to or higher than 900.

This configuration can deal with the IF signal of an actual terrestrial analog signal, terrestrial digital signal, 64 QAM digital signal, BS digital signal, BS analog signal and CS digital signal.

The optical transmitter according to this invention is an optical transmitter including the modulator according to this invention, comprising: an EO converter section for converting the modulated signal modulated by the modulator in an optical signal; a transmitting unit for the optical signal thus converted by the EO converter section.

In accordance with this configuration, the residual AM signal can be suppressed regardless of the frequency of the channel signal and deterioration of the channel signal due to impossibility of giving a sufficient FM demodulation amplitude in such a manner that as regards the channel signal at a low frequency, the optical frequency of the semiconductor laser is modulated by FM modulation and as regards the channel signal at a high frequency, the optical frequency of the semiconductor laser is modulated by the optical phase modulator.

The optical transfer device according to this invention is an optical transfer device including the optical transmitter according to this invention and an optical receiver for receiving the optical signal transmitted from the optical transmitter through an optical fiber, wherein the optical receiver comprises: a receiving unit for receiving the optical signal transmitted through the optical fiber; an OE converter section for converting the optical signal into an electric signal; and an FM demodulator for FM-demodulating the electric signal converted by the OE converted section.

In accordance with this configuration, the residual AM signal can be suppressed regardless of the frequency of the channel signal and deterioration of the channel signal due to impossibility of giving a sufficient FM demodulation amplitude in such a manner that as regards the channel signal at a low frequency, the optical frequency of the semiconductor laser is modulated by FM modulation and as regards the channel signal at a high frequency, the optical frequency of the semiconductor laser is modulated by the optical phase modulator.

ADVANTAGE OF THE INVENTION

In accordance with the modulator, optical transmitter and optical transfer device according to this invention, a channel signal can be modulated while suppressing residual AM signals regardless of the frequency of a channel signal and suppressing deterioration of the channel signal due to impossibility of giving a sufficient FM demodulation amplitude.

DESCRIPTION OF REFERENCE NUMERALS AND SIGNS

Figure 1:
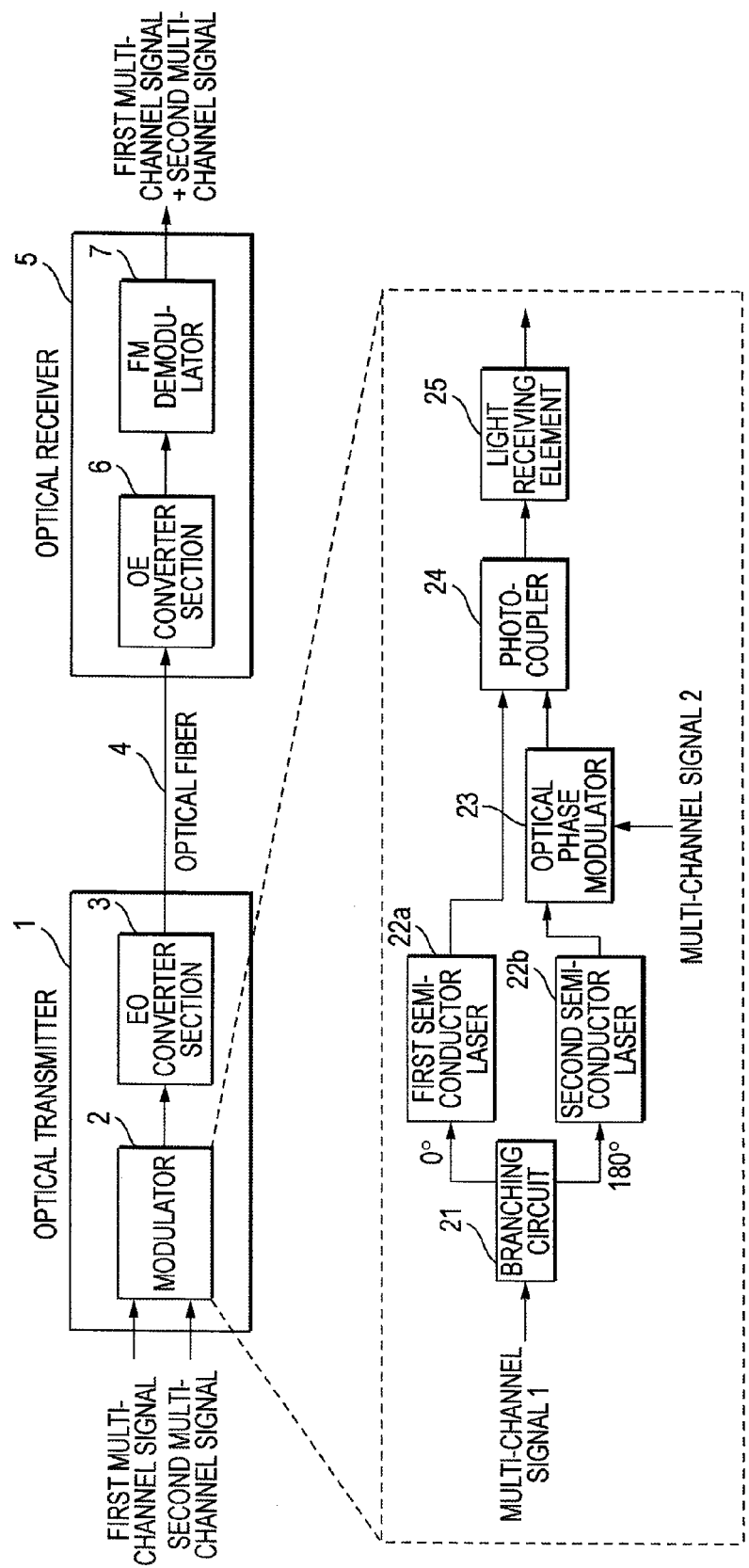
FIG. 1 is an arrangement view of the optical transfer device including a modulator according to the first embodiment of this invention.

21, 121 branching circuit
22a, 122a, 222a semiconductor laser
22b, 122b, 222b semiconductor laser
23, 223 optical phase-modulator
23a optical phase-modulator
23b optical phase-modulator
24, 124, 224 photo-coupler
25, 125, 225 light receiving element
26 optical delay function section
1 optical transmitter
2 modulator
3 EO conversion section
4 optical fiber
5 optical receiver
6 OE conversion section
7 FM demodulator

BEST MODE FOR CARRYING OUT THE INVENTION

Now referring to the drawings, a detailed explanation will be given of a modulator, an optical transmitter for transmitting a signal modulated by this modulator, and an optical transfer device including the optical transmitter according to this invention. Incidentally, like reference numerals refer to like parts in FIGS. 5 to 8.

Embodiment 1

A detailed explanation will be given of the modulator, optical transmitter and optical transfer device according to the first embodiment of this invention.

FIG. 1 is an arrangement view of an optical transfer device, including a modulator according to the first embodiment of this invention. The optical transfer device, including the modulator according to the first embodiment of this invention includes an optical transmitter 1 constructed of a modulator 2 for modulating inputted first and second multi-channel signals and an EO converter section for converting the signal thus modulated into an optical signal to be sent out to an optical fiber 4; and an optical receiver 5 constructed of an OE converter section 6 for converting the optical signal transferred through the optical fiber 4 into the electric signal and an FM demodulator 7 for FM demodulating the electric signal to be outputted.

Figure 2:
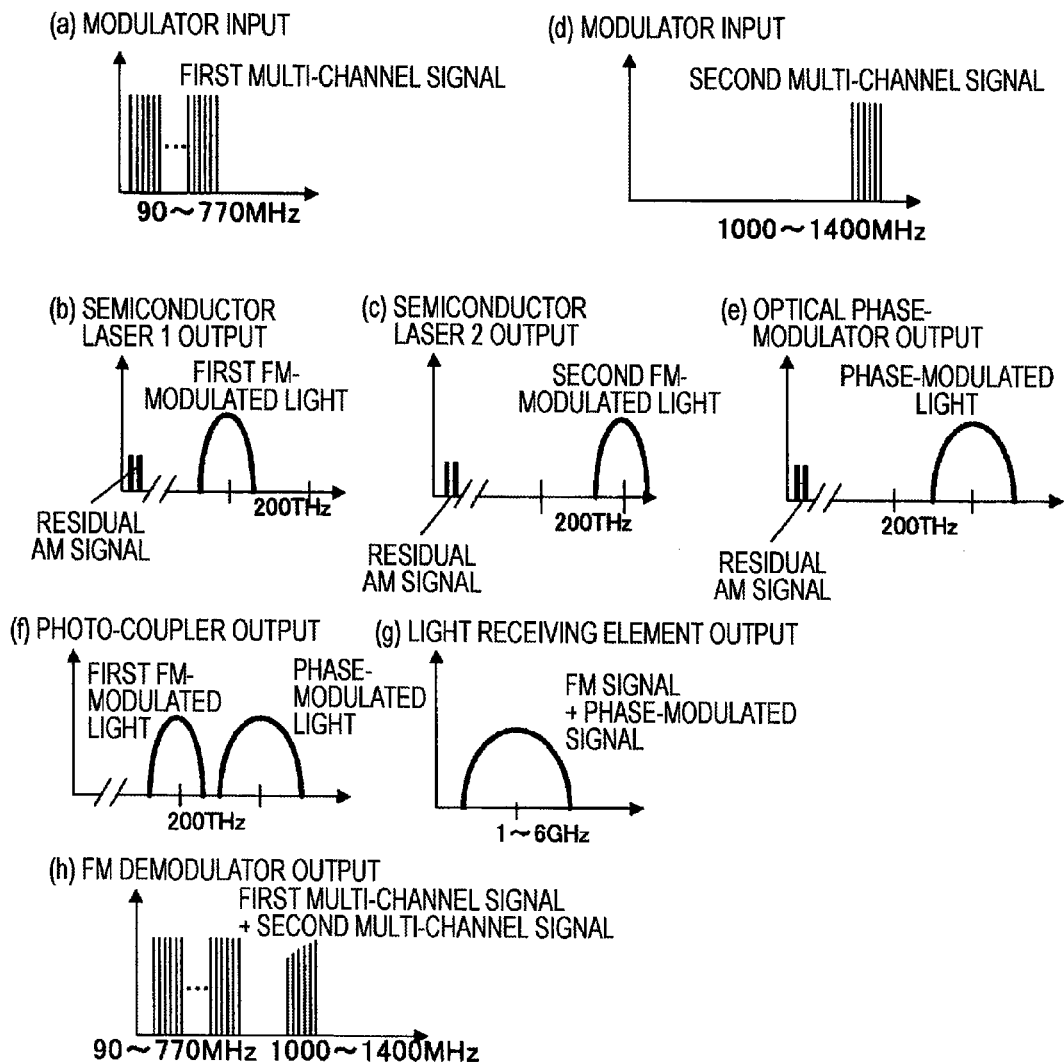
FIG. 2 shows output spectra of the respective components of a modulator according to the first embodiment of this invention and an FM demodulator.

Now referring to FIG. 1 and FIG. 2 showing the output spectra of the respective components of the FM modulator according to the first embodiment of this invention and an FM de-modulator, a detailed explanation will be given of the FM modulator 2.

A branching circuit 21, when a first multi-channel signal frequency-multiplexed by a channel signal at a low frequency of 900 MHz or lower as shown in FIG. 2(a) is supplied, supplies two first multi-channel signals phase-converted to a first semiconductor laser 22a and a second semiconductor laser 22b which provide different wavelengths, respectively.

The semiconductor laser 22a and the semiconductor laser 22b supply, to a photo-coupler 24, first and second FM-modulated light beams as shown in FIGS. 2(b) and 2(c) whose optical frequencies are FM-modulated on the basis of the input multi-channel signal, respectively. The spectrum of each the FM-modulated light beams produced from the semiconductor lasers 22a, 22b contains the residual AM signals having the same frequency component as the first multi-channel signal.

An optical phase modulator 23 further phase-modulates the second FM modulated light beam produced from the semiconductor laser 22b on the basis of the second multi-channel signal frequency-multiplexed by a channel signal at a high frequency of 900 MHz or higher, as shown in FIG. 2(d), thereby producing the phase-modulated light beam shown in FIG. 2(e).

A photo-coupler 24 merges the first FM-modulated light beam supplied from the semiconductor laser 22a and the phase-modulated light beam supplied from the optical phase modulator 23 and supplies the resultant optical signal to a light-receiving element 25. Since the two multi-channel signals which FM-modulate the optical frequencies of the semiconductor laser 22a and the semiconductor laser 22b are inverted in their phase, the above residual AM components are also converted in their phase. Thus, in merging, the photo-coupler 24 cancels the residual AM components the residual AM components of the FM modulated light beams produced from the semiconductor laser 22a and the semiconductor laser 22b, respectively. As a result, the optical signal produced from the photo-coupler 24 does not contain the residual AM signal as shown in FIG. 2(f).

The light receiving element 25 produces, through optical heterodyne detection, a modulated signal which is an electric signal based on a frequency difference between the merged first FM modulated light and phase-modulated light. FIG. 2(g) shows the modulated signal produced from the light-receiving element 25. This modulated signal is a mixed signal of the FM-modulated signal of the first multi-channel signal supplied to the semiconductor lasers 22a, 22b and the phase-modulated signal of the second multi-channel signal supplied to the optical phase-modulator 23. Its central frequency is determined by a difference between the central values of the optical frequencies of the two semiconductor lasers 22a, 22b.

By FM-demodulating the modulated signal produced from the light receiving element 25, the optical receiver 5 receives a mixed multi-channel signal of the first multi-channel signal and the second multi-channel signal. Thus, the multi-channel signal can be demodulated without generating deterioration in the channel signal at a low frequency. Since the phase modulation and the frequency modulation are angular modulation systems belonging to substantially the same category, the multi-channel signal can be demodulated by the FM demodulator 7 in the optical receiver 5.

In accordance with the optical transfer device including the modulator according to the first embodiment of this invention, the residual AM signal can be suppressed regardless of the frequency of the channel signal and deterioration of the channel signal due to impossibility of giving a sufficient FM demodulation amplitude in such a manner that as regards the channel signal at a low frequency, the optical frequency of the semiconductor laser is modulated by FM modulation and as regards the channel signal at a high frequency, the optical frequency of the semiconductor laser is modulated by the optical phase modulator.

Embodiment 2

Figure 3:
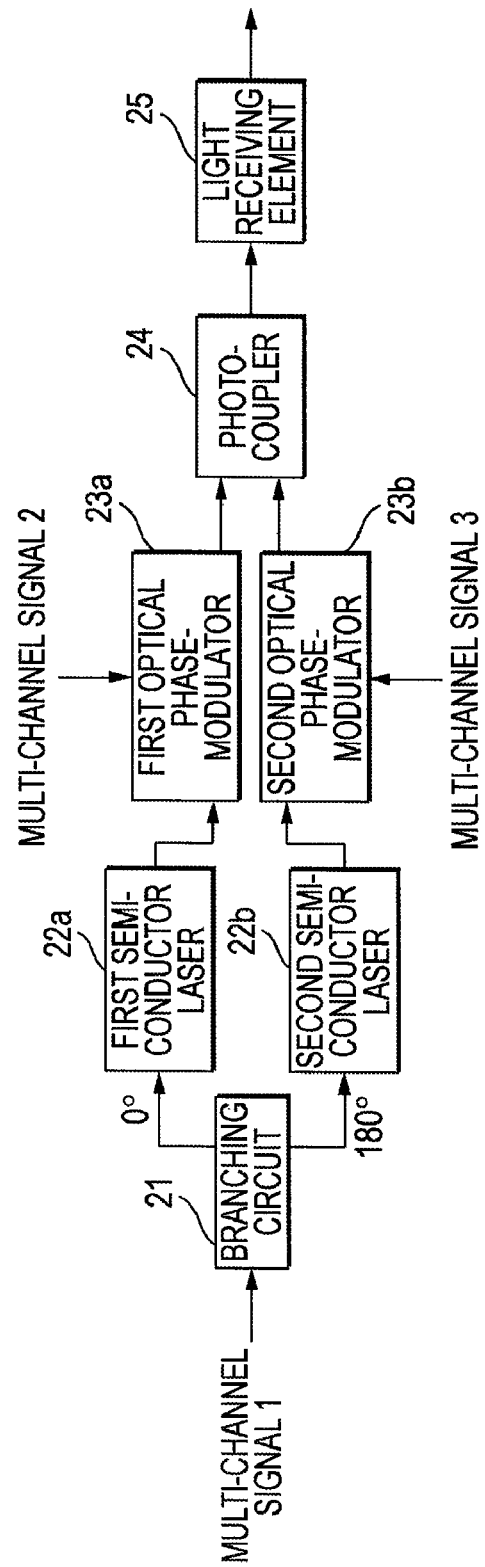
FIG. 3 is an arrangement view of a modulator according to the second embodiment of this invention.

FIG. 3 is an arrangement view of the modulator according to the second embodiment of this invention. Incidentally, like reference numerals refer to like parts in FIG. 1.

In the modulator according to the second embodiment of this invention, a first optical phase modulator 23a for executing optical phase modulation is placed between the first semiconductor laser 22a and the photo-coupler 24 and a second optical phase modulator 23b is placed between the second semiconductor laser 22b and the photo-coupler 24 so that different second and third multi-channel signals, frequency-multiplexed by the channel signal at a high frequency of 900 MHz or higher, are supplied to the corresponding optical phase modulators 23a, 23b.

The photo-coupler 24 merges the phase-modulated light beams produced from the optical phase modulators 23a, 23b, and supplies the resultant optical signal to the light receiving element 25.

In accordance with the optical transfer device including the modulator according to the second embodiment of this invention, the FM-modulated light beams produced from the first and second semiconductor lasers are phase-modulated by the different multi-channel signals, respectively, so that a large number of multi-channel signals can be modulated at a time.

Embodiment 3

Figure 4:
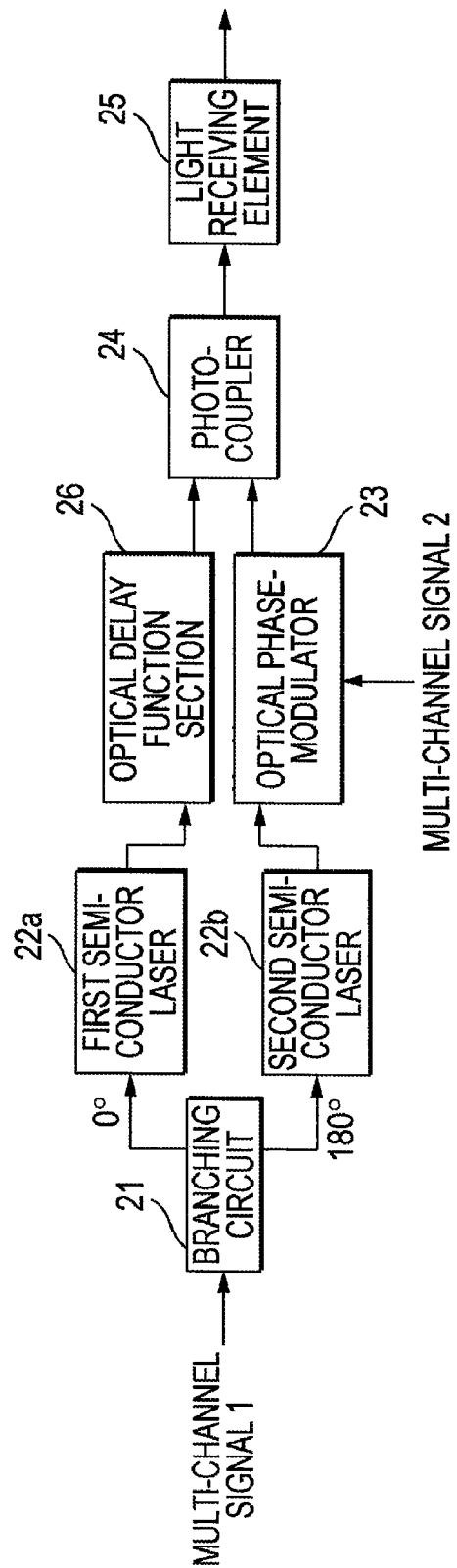
FIG. 4 is an arrangement view of a modulator according to the third embodiment of this invention.
Figure 5:
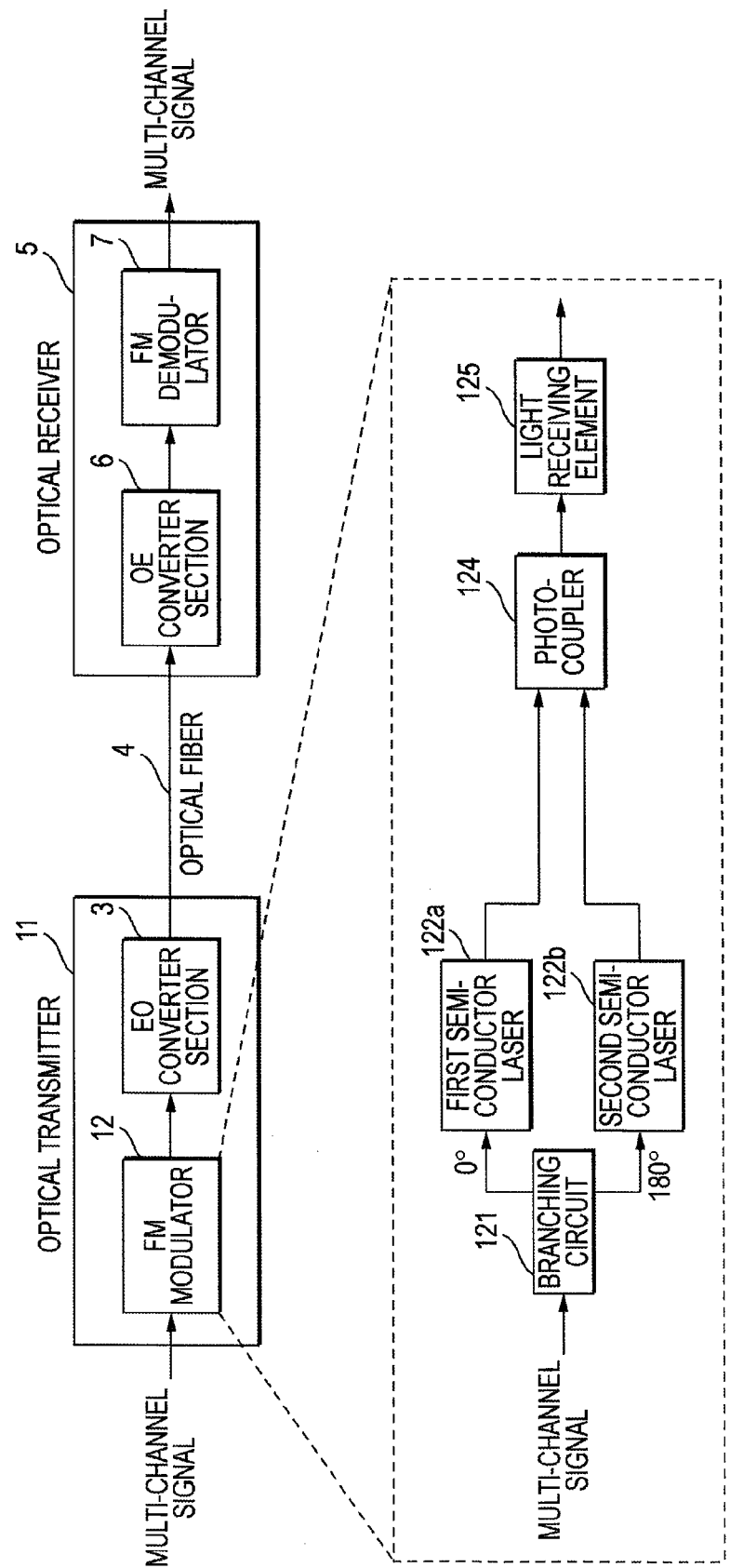
FIG. 5 is an arrangement view of a conventional optical transfer device, including an FM modulator using the optical heterodyne detecting system.
Figure 6:
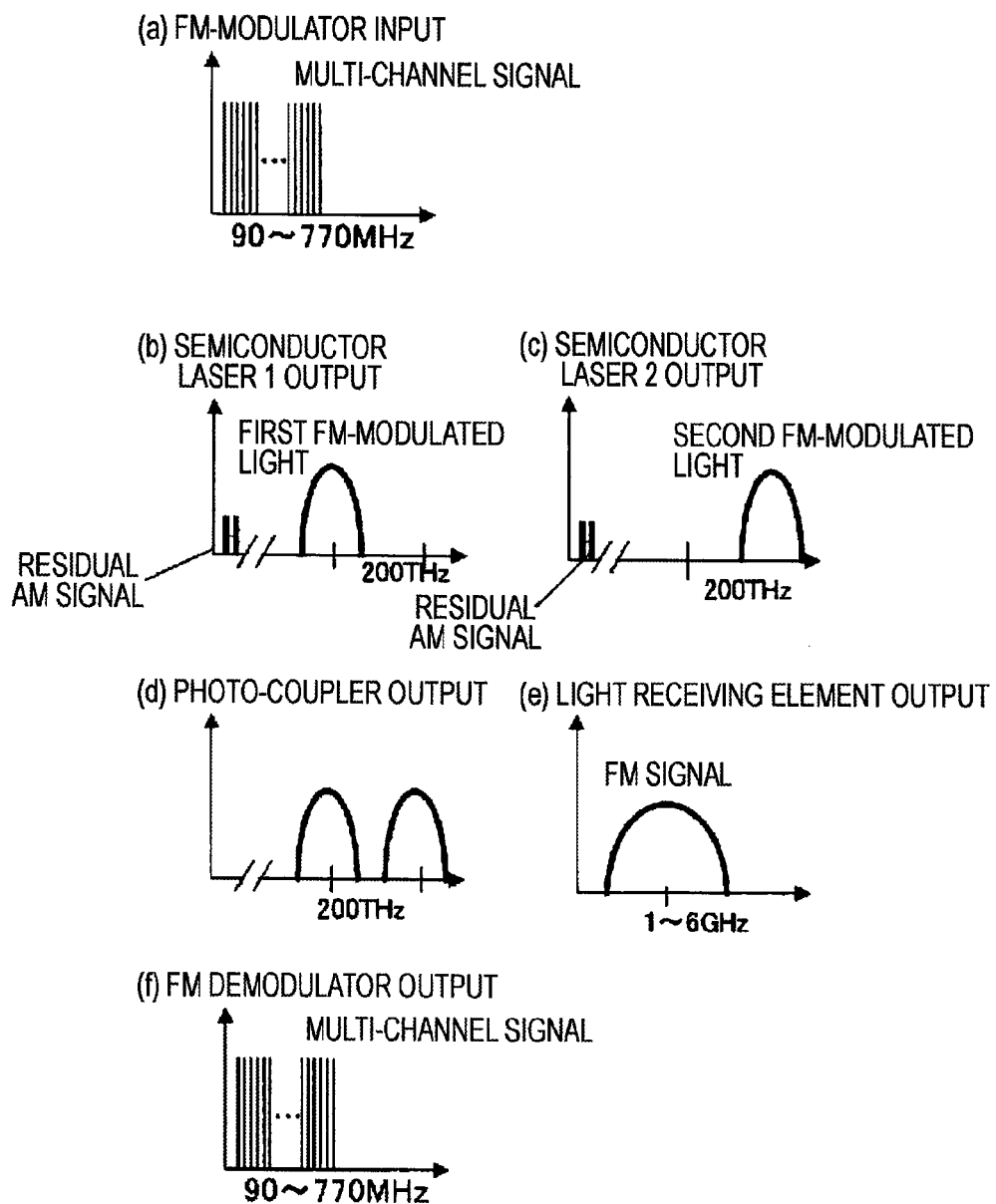
FIG. 6 shows output spectra of the respective components of a conventional FM modulator and a conventional FM de-modulator.
Figure 7:
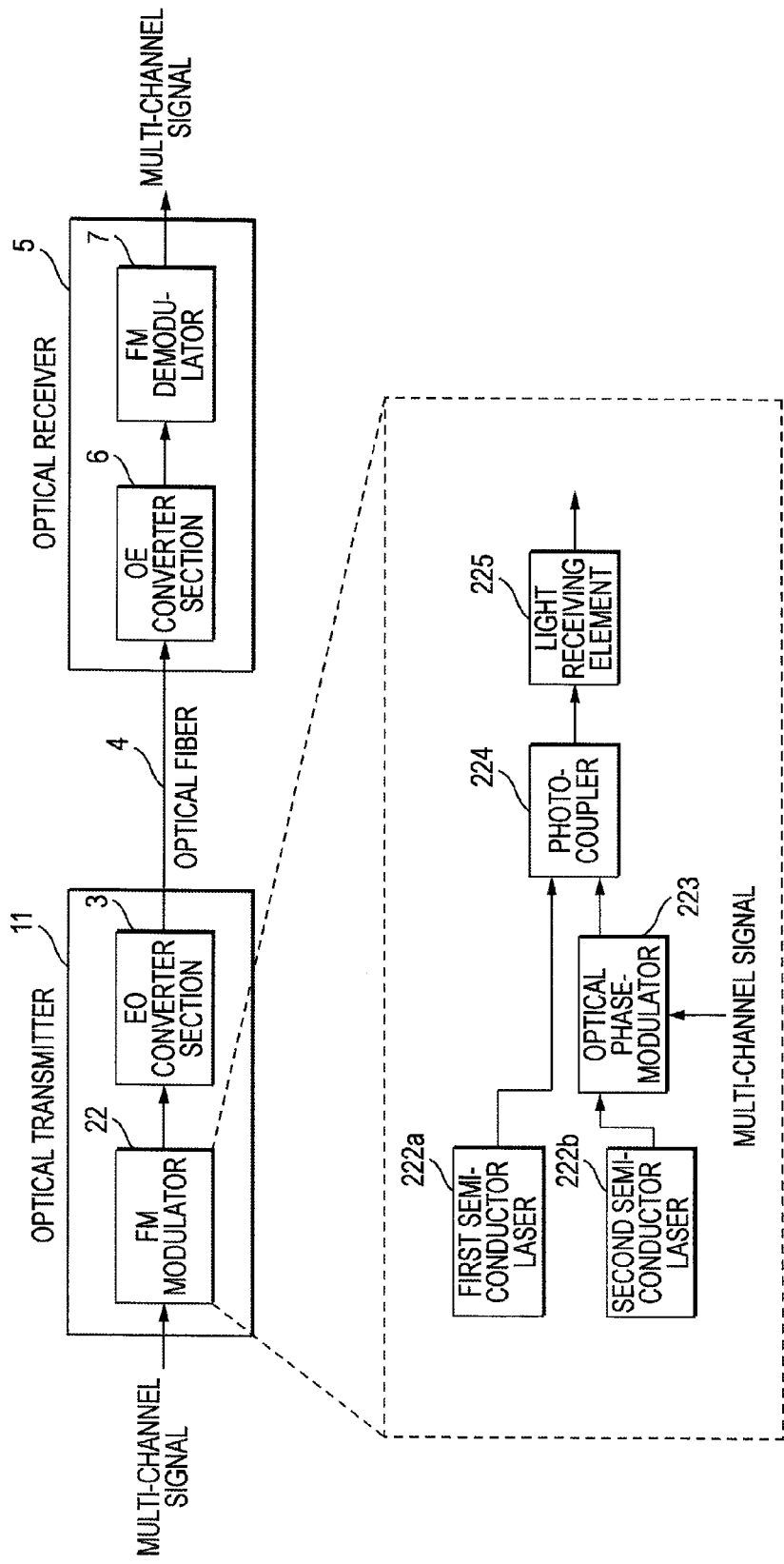
FIG. 7 is an arrangement view of a conventional optical transfer device, including an optical phase-modulator using the optical heterodyne detecting system.
Figure 8:
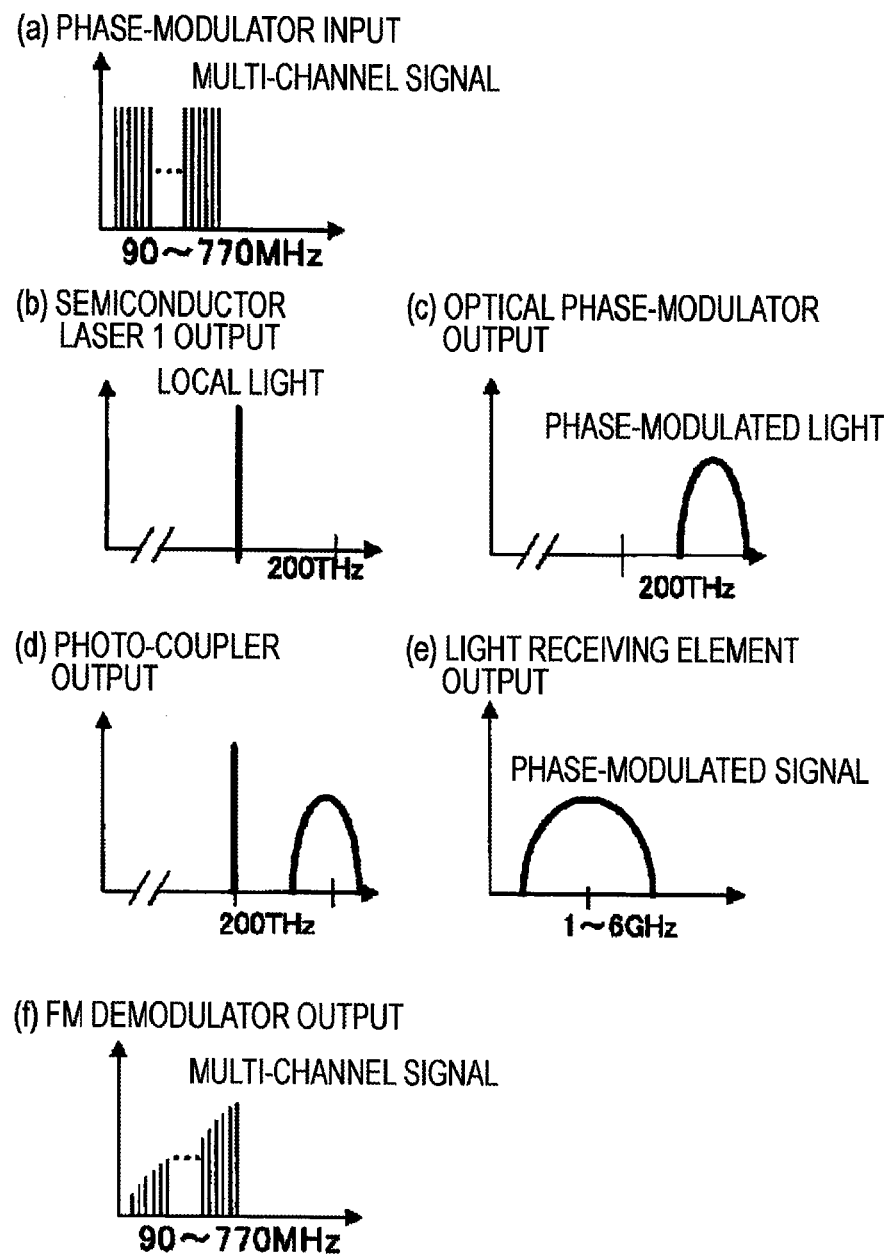
FIG. 8 shows output spectra of the respective components of a conventional optical phase-modulator and a conventional FM de-modulator.

FIG. 4 is an arrangement view of the modulator according to the third embodiment of this invention. Like reference numerals refer to like parts in FIG. 1.

Like the modulator according to the first embodiment of this invention shown in FIG. 1, where the FM-modulated light beam produced from the second semiconductor laser 22b is optically phase-modulated by the optical phase modulator 23, a delay due to the optical phase modulation occurs. This generates a time difference between the time taken for the FM-modulated light beam supplied from the first semiconductor laser 22a to the photo-coupler 24 and the time taken for the phase-modulated light beam supplied from the second semiconductor laser 22b to the photo-coupler 24 through the optical phase modulator 23. As a result, as the case may be, the phase of the FM-modulated light beam produced from the first semiconductor laser and the phase of the phase-modulated light beam produced from the second semiconductor laser cannot be exactly inverted.

In the modulator according to the third embodiment of this invention, an optical delay function section 26 is placed between the first semiconductor laser 22a and the photo-coupler 24. By providing the optical delay function section 26, the phase of the FM-modulated light beam produced from the first semiconductor laser is delayed by the extent of delay occurred owing to the optical phase modulation by the optical phase modulator 23.

In accordance with the optical transfer device including the modulator according to the third embodiment of this invention, even if the delay occurs in the phase modulation by the optical phase modulator, the phase of the FM-modulated light beam produced from the first semiconductor laser and the phase of the phase-modulated light beam produced from the second semiconductor laser can be exactly inverted. For this reason, by merging these inverted two modulated light beams, the residual AM signals can be cancelled.

Incidentally, the optical delay function section 26 may be replaced by an optical waveguide such as an optical fiber. Further, as in the second embodiment, the FM modulated light beams produced from the first and second semiconductor lasers may be phase-modulated by the corresponding optical phase modulators so that the phase-modulated light beams delayed by equal times are produced. In this way, the time difference does not occur between the phase-modulated light beams produced from the corresponding optical phase modulators.

Further, in the modulator according to the third embodiment of this invention, the phase of the FM-modulated light beam produced from the first semiconductor laser 22*a* was optically delayed by the optical delay function section 26. However, a control section for controlling the timing of supplying the FM modulated light to the first and second semiconductor lasers may be provided between the branching circuit 21 and the first and second semiconductor lasers 22 So that the multi-channel signal is supplied to the first semiconductor laser at the timing later than the timing of supplying the multi-channel signal to the second semiconductor laser, or inversely the multi-channel signal is supplied to the first semiconductor laser at the timing earlier than the timing of supplying the multi-channel signal to the second semiconductor laser.

This invention has been explained in details and referring to the specific embodiments. However, it is apparent to those skilled in the art that this invention can be changed or modified in various manners without departing the spirit and scope of the invention.

This application is based on Japanese Patent Application (Patent Application No. 2004-224146) filed on Jul. 30, 2004 and its contents are incorporated herein by reference.

INDUSTRIAL APPLICABILITY

The modulator, optical transmitter and optical transfer device according to this invention has an advantage that they can modulate a channel signal while suppressing residual AM signals regardless of the frequency of a channel signal and suppressing deterioration of the channel signal due to impossibility of giving a sufficient FM demodulation amplitude. They are useful to the optical transfer device for transferring a multi-channel signal through an optical fiber, particularly, a modulator for modulating the multi-channel signal, an optical transmitter for transmitting the signal modulated by this modulator and an optical transfer device including the optical transmitter.

The invention claimed is:

1. A modulator for modulating an input signal, comprising:
    a phase inverting unit that produces an inverted signal with an inverted phase of the phase of a first input signal transferred within a first frequency bandwidth;
    a first semiconductor laser that FM-modulates the first input signal to produce a first FM-modulated light beam;
    a second semiconductor laser that FM-modulates the inverted signal to produce a second FM-modulated light beam;
    an optical phase-modulating unit that changes the phase of one of the first FM-modulated light beam and the second FM-modulated light beam on the basis of a second input signal transferred within a second frequency bandwidth to produce a phase-modulated light beam;
    an optical merging unit that merges the phase-modulated light beam and the other of the first FM-modulated light beam and the second FM-modulated light beam to produce a modulated light beam; and
    a photoelectric converting unit that converts the modulated light beam in a modulated signal by optical heterodyne detection,
    wherein the second frequency bandwidth is higher than the first frequency bandwidth.

2. The modulator according to claim 1, wherein the optical phase modulating unit changes the phase of the first FM-modulated light beam on the basis of the second input signal to produce a first phase-modulated light beam and changes the phase of the second FM-modulated light beam on the basis of a third input signal transferred with a third frequency bandwidth to produce a second phase-modulated light beam;
    wherein the optical merging unit merges the first phase-modulated light beam and the second-modulated light beam to produce the modulated light beam; and
    wherein the third frequency bandwidth is higher than the first frequency bandwidth.

3. The modulator according to claim 1, further comprising a timing control unit that controls the timing of producing the first FM-modulated light beam from the first semiconductor laser or the timing of producing the second FM-modulated light beam from the second semiconductor laser.

4. The modulator according to claim 1, further comprising an optical delaying unit that delays the phase of one of the first FM-modulated light beam and the second FM-modulated light beam.

5. The modulator according to claim 2, wherein the first input signal, the second input signal, and the third input signal are multi-channel signals frequency-multiplexed, respectively.

6. The modulator according to claim 2, wherein the first frequency bandwidth is equal to or lower than 900 MHz, and the second frequency bandwidth and third frequency bandwidth are equal to or higher than 900 MHz.

7. An optical transmitter including the modulator according to claim 1, comprising:
    an EO converter section that converts the modulated signal modulated by the modulator in an optical signal; and
    a transmitting unit that transfers the optical signal converted by the EO converter section.

8. An optical transfer device including the optical transmitter according to claim 7 and an optical receiver for receiving the optical signal transmitted from the optical transmitter through an optical fiber, wherein the optical receiver includes:
    a receiving unit that receives the optical signal transmitted through the optical fiber;
    an OE converter section that converts the optical signal into an electric signal; and
    an FM demodulator that FM-demodulates the electric signal converted by the OE converted section.

* * * * *